United States Patent Office 2,959,100
Patented Nov. 8, 1960

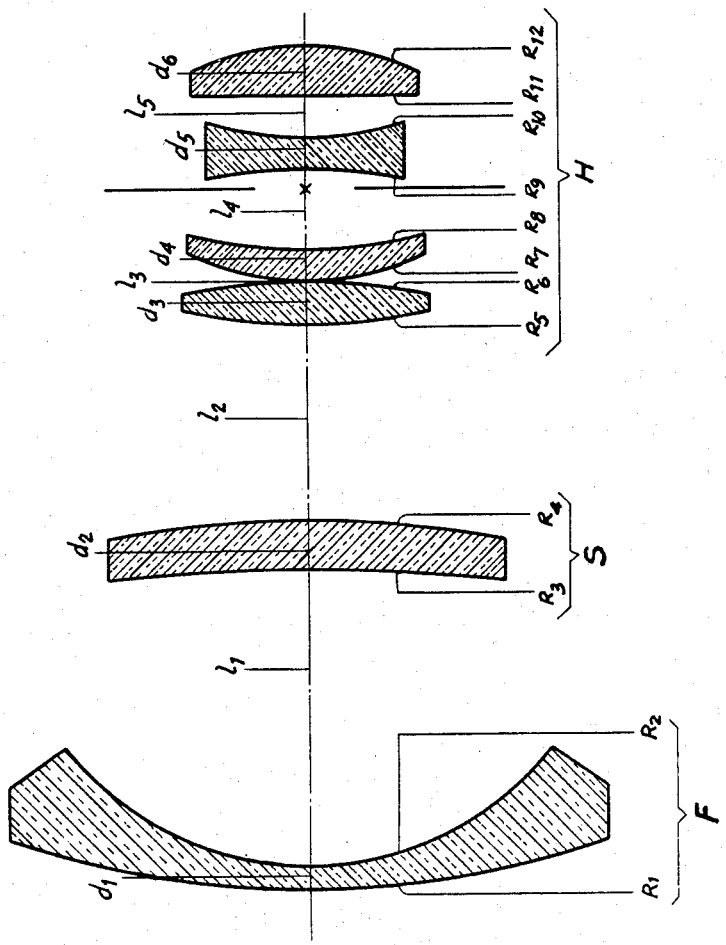

2,959,100
WIDE ANGLE PHOTOGRAPHIC OBJECTIVE

Hans Lautenbacher, Munich, Germany, assignor to Enna-Werk Optische Anstalt Dr. Appelt K.G., Munich, Germany, a German firm Filed Feb. 5, 1957, Ser. No. 638,296

Claims priority, application Germany Feb. 13, 1956

2 Claims. (Cl. 88—57)

The invention relates to a wide angle photographic objective of the type having a meniscus-shaped front part F, convex towards incident light and having negative power, which is separated by a relatively large air space from the rear main part H, comprising a lens system of known type (such as simple or modified triplet, modified Gauss-type or the like).

The back focal length of objectives of this described type usually shows unessential deviations from the focal length of the total system. Said objectives mostly have a good and well-balanced correction of all image defects and cover a field of more than 60°.

The invention has for its object the design of an extreme wide angle lens covering a field of more than 70°, the characteristics of said design providing the possibility of being used even in such cameras in which for mechanical reasons—as it is in single reflex cameras—a back focal length of at least 1.2 times the focal length of the total system is necessary.

Objectives showing these characteristics are known. The front part of said objectives may be formed in such a manner that a collective single element, the stronger curved surface of which is turned towards incident light, is followed by a dispersive meniscus of relatively strong power, the stronger curved surface of which is turned to the following main part of the system, both parts, the front part and the rear main part being separated by a large air space.

In the accompanying drawings the single figure is a diagrammatic sectional view which shows one embodiment of the invention.

The objectives of the invention are so formed that between the meniscus-shaped dispersive front part F and the rear main part H, there is arranged a median part S that may be composed either of a single lens or a lens combination of collective power, the focal length of said lens or lens combination S ranging between 2.0 times and 20 times the absolute focal length of the dispersive front part F, and the air space between said lens or lens combination S and the following rear main part H ranging between 0.1 times and 1.0 times the focal length of the total system.

This specific new arrangement makes it possible to attain a better and more balanced correction of all image defects as it has been the case with objectives heretofore known. This does not only refer to monochromatic correction, but also to the correction of a wave length range for which the correction of a modern, so-called "color-corrected" photographic objective ought to be effected, which is very important in view of the extension of the field covered. Moreover, the lens arrangement according to the invention makes it possible to keep vignetting of such objectives very small, thereby avoiding the use of over-dimensioned and thus expensive elements as they are used in the front part of known objectives.

In order to stretch both astigmatic curves substantially it has proven advantageous to choose the position of median part S, namely the collective lens or lens combination between the dispersive meniscus-shaped front part F and the rear main part H of the total system in such a way that the axial air space between said collective lens or lens combination S and the rear main part H is at least 0.3 times and at the utmost 1.5 times the axial air space between the dispersive front part F and said collective lens combination S.

Two specific examples are given below.

EXAMPLE 1

The Example 1 represents the constructional data of a wide angle objective according to the present invention, set forth below in Table I:

Table I

[Focal length: $f=100.0$. Back focal length: $s'=125.842$. Relative aperture: 1:3.5. Field covered: 75°]

| Part | Lens Radii | Lens Thicknesses ($d$) and distances ($l$) in the optical axis | Glass Quality | |
|---|---|---|---|---|
| | | | refraction indices | Abbé Numbers (dispersion ratios) |
| F | $R_1 = +193.000$ | $d_1 = 4.2$ | $n_1 = 1.62280$ | $\nu_1 = 56.9$ |
| | $R_2 = + 62.434$ | $l_1 = 58.0$ | | |
| S | $R_3 = -350.000$ | $d_2 = 10.0$ | $n_2 = 1.62536$ | $\nu_2 = 35.6$ |
| | $R_4 = -227.000$ | $l_2 = 38.5$ | | |
| H | $R_5 = +122.000$ | $d_3 = 8.5$ | $n_3 = 1.61272$ | $\nu_3 = 58.6$ |
| | $R_6 = -143.716$ | $l_3 = 0.5$ | | |
| | $R_7 = + 58.800$ | $d_4 = 6.0$ | $n_4 = 1.62536$ | $\nu_4 = 35.6$ |
| | $R_8 = +105.562$ | $l_4 = 16.0$ | | |
| | $R_9 = -100.000$ | $d_5 = 6.6$ | $n_5 = 1.75520$ | $\nu_5 = 27.5$ |
| | $R_{10} = + 65.500$ | $l_5 = 8.0$ | | |
| | $R_{11} = \infty$ | $d_6 = 10.0$ | $n_6 = 1.61720$ | $\nu_6 = 54.0$ |
| | $R_{12} = - 52.344$ | | | |

The single figure of the drawing represents a sectional view of an objective based on the constructional data of Example 1, having a focal length of $f=100.0$ and showing the radii ($R_1 \ldots R_{12}$) of the refracting lens surfaces counting from the front to the rear of the objective, the axial lens thickness ($d_1 \ldots d_6$) and the axial distances ($l_1 \ldots l_5$) between the lenses, as listed in the tables.

EXAMPLE 2

Naturally, the constructional possibilities according to the above described invention may also be applied to objectives covering a smaller field than 70°. In this case the back focal length may be kept practically equal to the focal length of the total system. The Example 2 shows such an objective in the Table II below:

Table II

[Focal length: $f=100.0$. Back focal length: $s'=102.209$. Relative aperture: 1:2.5. Field covered: 65°]

| Part | Lens Radii | Lens Thicknesses (d) and distances (l) in the optical axis | Glass Quality refraction indices | Abbé Numbers (dispersion ratios) |
|---|---|---|---|---|
| F | $R_1 = +350.000$ | $d_1 = 4.0$ | $n_1 = 1.51812$ | $\nu_1 = 65.2$ |
|   | $R_2 = + 78.900$ | $l_1 = 30.0$ | | |
| S | $R_3 = \infty$ | $d_2 = 7.0$ | $n_2 = 1.62536$ | $\nu_2 = 35.6$ |
|   | $R_4 = -400.000$ | $l_2 = 17.0$ | | |
|   | $R_5 = +110.360$ | $d_3 = 7.0$ | $n_3 = 1.74400$ | $\nu_3 = 44.9$ |
|   | $R_6 = -590.000$ | $l_3 = 0.2$ | | |
|   | $R_7 = + 62.700$ | $d_4 = 7.0$ | $n_4 = 1.69347$ | $\nu_4 = 53.5$ |
| H | $R_8 = +140.000$ | $l_4 = 11.3$ | | |
|   | $R_9 = - 95.400$ | $d_5 = 5.5$ | $n_5 = 1.69895$ | $\nu_5 = 30.0$ |
|   | $R_{10} = + 53.060$ | $l_5 = 13.0$ | | |
|   | $R_{11} = +375.000$ | $d_6 = 10.0$ | $n_6 = 1.65160$ | $\nu_6 = 58.5$ |
|   | $R_{12} = - 49.984$ | | | |

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. A wide angle photographic objective having a front part, a median part and a rear part with the following constructional data:

[Focal length: $f=100.0$. Back focal length: $s'=125.842$. Relative aperture: 1:3.5. Field covered: 75°]

| $R_1 = +193.000$ | $d_1 = 4.2$ | $n_1 = 1.62280$ | $\nu_1 = 56.9$ |
|---|---|---|---|
| $R_2 = + 62.434$ | $l_1 = 58.0$ | | |
| $R_3 = -350.000$ | $d_2 = 10.0$ | $n_2 = 1.62536$ | $\nu_2 = 35.6$ |
| $R_4 = -227.000$ | $l_2 = 38.5$ | | |
| $R_5 = +122.000$ | $d_3 = 8.5$ | $n_3 = 1.61272$ | $\nu_3 = 58.6$ |
| $R_6 = -143.716$ | $l_3 = 0.5$ | | |
| $R_7 = + 58.800$ | $d_4 = 6.0$ | $n_4 = 1.62536$ | $\nu_4 = 35.6$ |
| $R_8 = +105.562$ | $l_4 = 16.0$ | | |
| $R_9 = -100.000$ | $d_5 = 6.6$ | $n_5 = 1.75520$ | $\nu_5 = 27.5$ |
| $R_{10} = + 65.500$ | $l_5 = 8.0$ | | |
| $R_{11} = \infty$ | $d_6 = 10.0$ | $n_6 = 1.61720$ | $\nu_6 = 54.0$ |
| $R_{12} = - 52.344$ | | | | wherein $R_1 \ldots R_{12}$ are values of the radii of the refractory lens surfaces counting from the front to the rear of the objective; $d_1 \ldots d_6$ are the axial lens thicknesses from the front to the rear of the objective; $l_1 \ldots l_5$ are the axial distances between the lenses; $n_1 \ldots n_5$ are the values of the index of refraction; and $v_1 \ldots v_6$ are the dispersion ratios or Abbé numbers of the materials of the lens elements.

2. A wide angle photographic objective having a front part, a rear part and therebetween a median part with the following constructional data:

[Focal length: $f=100.0$. Back focal length: $s'=102.209$. Relative aperture: 1:2.5. Field covered: 65°]

| $R_1 = +350.000$ | $d_1 = 4.0$ | $n_1 = 1.51821$ | $\nu_1 = 65.2$ |
|---|---|---|---|
| $R_2 = + 78.900$ | $l_1 = 30.0$ | | |
| $R_3 = \infty$ | $d_2 = 7.0$ | $n_2 = 1.62536$ | $\nu_2 = 35.6$ |
| $R_4 = -400.000$ | $l_2 = 17.0$ | | |
| $R_5 = +110.360$ | $d_3 = 7.0$ | $n_3 = 1.74400$ | $\nu_3 = 44.9$ |
| $R_6 = -590.000$ | $l_3 = 0.2$ | | |
| $R_7 = + 62.700$ | $d_4 = 7.0$ | $n_4 = 1.69347$ | $\nu_4 = 53.5$ |
| $R_8 = +140.000$ | $l_4 = 11.3$ | | |
| $R_9 = - 95.400$ | $d_5 = 5.5$ | $n_5 = 1.69895$ | $\nu_5 = 30.1$ |
| $R_{10} = + 53.060$ | $l_5 = 13.0$ | | |
| $R_{11} = +375.000$ | $d_6 = 10.0$ | $n_6 = 1.65160$ | $\nu_6 = 58.5$ |
| $R_{12} = - 49.984$ | | | | wherein $R_1 \ldots R_{12}$ are values of the radii of the refractory lens surfaces counting from the front to the rear of the objective; $d_1 \ldots d_6$ are the axial lens thicknesses from the front to the rear of the objective; $l_1 \ldots l_5$ are the axial distances between the lenses; $n_1 \ldots n_5$ are the values of the index of refraction; and $v_1 \ldots v_6$ are the dispersion ratios or Abbé numbers of the materials of the lens elements.

References Cited in the file of this patent

UNITED STATES PATENTS

| 1,934,561 | Rayton | Nov. 7, 1933 |
|---|---|---|
| 2,324,057 | Bennett | July 13, 1943 |
| 2,582,085 | Tolle | Jan. 8, 1952 |
| 2,594,021 | Hopkins et al. | Apr. 22, 1952 |
| 2,612,077 | Albrecht | Sept. 30, 1952 |
| 2,752,821 | Cook | July 3, 1956 |
| 2,835,168 | Lange | May 20, 1958 |

FOREIGN PATENTS

| 927,540 | Germany | May 12, 1955 |
|---|---|---|

UNITED STATES PATENT OFFICE

CERTIFICATION OF CORRECTION

Patent No. 2,959,100                        November 8, 1960

Hans Lautenbacher

It is hereby certified that error appears in the above numbered patent requiring correction and that the said Letters Patent should read as corrected below.

In the grant (only), line 1, name of inventor, for "Hans Lautenvacher" read -- Hans Lautenbacher --.

Signed and sealed this 2nd day of May 1961.

(SEAL)
Attest:

ERNEST W. SWIDER
Attesting Officer

DAVID L. LADD
Commissioner of Patents